(12) United States Patent
Shepelev et al.

(10) Patent No.: US 9,965,104 B2
(45) Date of Patent: May 8, 2018

(54) DEVICE AND METHOD FOR INTERFERENCE AVOIDANCE IN AN INPUT DEVICE

(75) Inventors: Petr Shepelev, San Jose, CA (US); Adam Schwartz, Redwood City, CA (US); Tracy Scott Dattalo, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 825 days.

(21) Appl. No.: 13/009,606

(22) Filed: Jan. 19, 2011

(65) Prior Publication Data
US 2012/0182229 A1 Jul. 19, 2012

(51) Int. Cl.
G06F 3/041 (2006.01)
G06F 3/044 (2006.01)

(52) U.S. Cl.
CPC ............ *G06F 3/044* (2013.01); *G06F 3/0418* (2013.01)

(58) Field of Classification Search
CPC ............................... G06F 3/0418; G06F 3/044
USPC ........................................... 345/76, 170–176
See application file for complete search history.

(56) References Cited

U.S. PATENT DOCUMENTS

| | | | |
|---|---|---|---|
| 5,053,757 A | 10/1991 | Meadows | |
| 8,040,142 B1 * | 10/2011 | Bokma et al. | 324/658 |
| 2006/0115014 A1 * | 6/2006 | Jeong et al. | 375/267 |
| 2006/0221061 A1 | 10/2006 | Fry | |
| 2006/0227115 A1 | 10/2006 | Fry | |
| 2007/0027675 A1 * | 2/2007 | Hertz | 704/200.1 |
| 2007/0257890 A1 * | 11/2007 | Hotelling et al. | 345/173 |
| 2007/0262969 A1 * | 11/2007 | Pak | 345/173 |
| 2008/0024455 A1 * | 1/2008 | Lee et al. | 345/173 |
| 2008/0040079 A1 * | 2/2008 | Hargreaves | 702/191 |
| 2008/0157893 A1 | 7/2008 | Krah | |
| 2008/0158169 A1 | 7/2008 | O'Connor et al. | |
| 2008/0158182 A1 | 7/2008 | Westerman | |
| 2008/0309625 A1 * | 12/2008 | Krah et al. | 345/173 |
| 2008/0309628 A1 | 12/2008 | Krah et al. | |
| 2009/0009483 A1 * | 1/2009 | Hotelling et al. | 345/173 |
| 2011/0063993 A1 * | 3/2011 | Wilson et al. | 370/254 |
| 2011/0241651 A1 * | 10/2011 | Oda | 324/76.39 |
| 2011/0298759 A1 * | 12/2011 | Yang et al. | 345/178 |

\* cited by examiner

*Primary Examiner* — Tony Davis
(74) *Attorney, Agent, or Firm* — FBFK PC

(57) ABSTRACT

Devices and methods are provided that facilitate improved interference avoidance performance. The devices and methods determine a relative ranking for a plurality of transmitter signals based on a first class of interference for each transmitter signal of the plurality of transmitter signals. The devices and methods transmit a first transmitter signal of the plurality of transmitter signals with a sensor electrode of the plurality of sensor electrodes. The first transmitter signal is selected based on the relative ranking for the plurality of transmitter signals. The devices and methods shift from transmitting the first transmitter signal to transmitting a second transmitter signal of the plurality of transmitter signals with the sensor electrode is based on an amount of a second class of interference in the first transmitter signal. The second transmitter signal is selected based on the relative ranking for the plurality of transmitter signals.

14 Claims, 8 Drawing Sheets

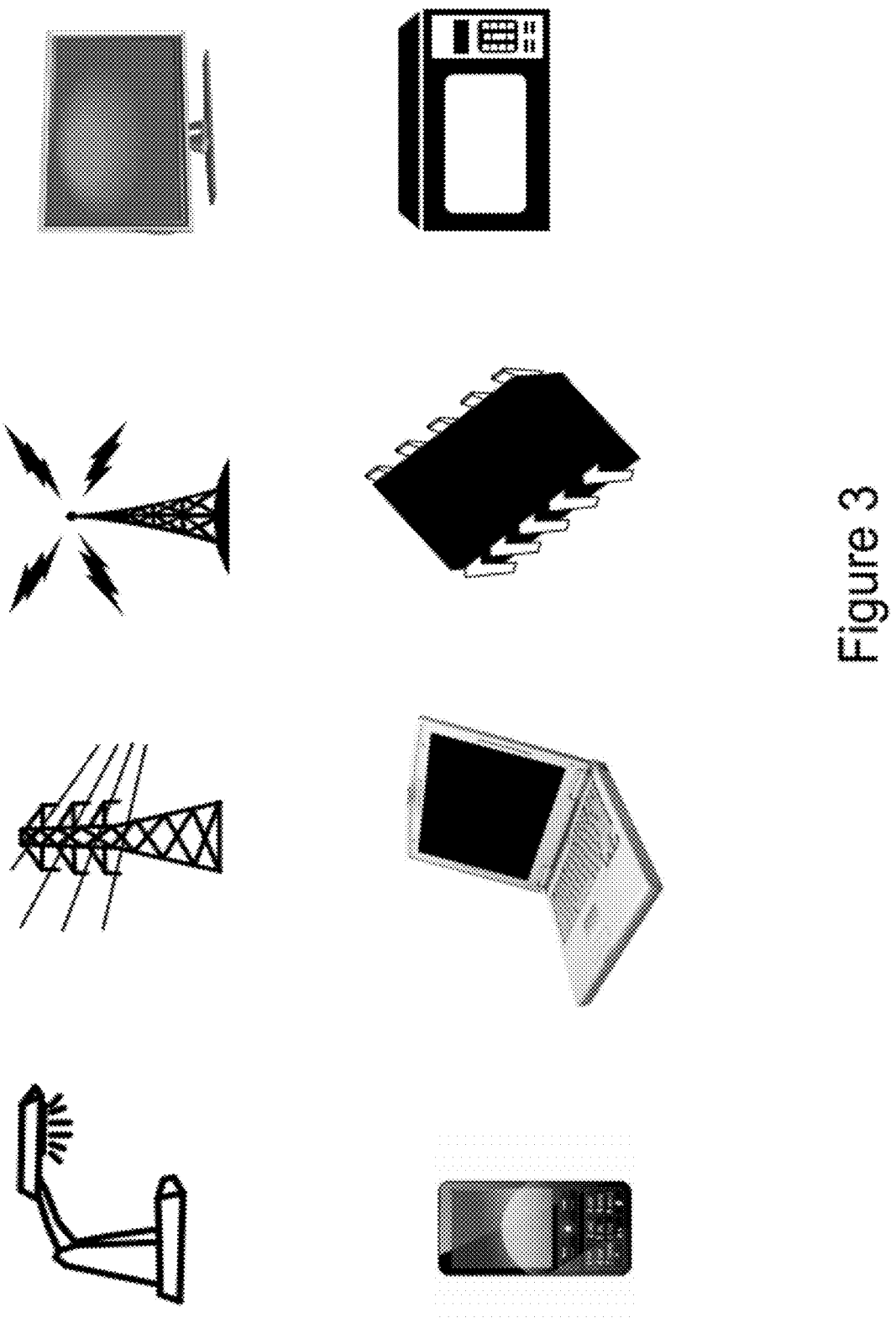

DEVICE AND METHOD FOR INTERFERENCE AVOIDANCE IN AN INPUT DEVICE

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

Devices and methods are provided that facilitate improved interference avoidance performance. The devices and methods determine a relative ranking for a plurality of transmitter signals based on a first class of interference for each transmitter signal of the plurality of transmitter signals. Each transmitter signal of the plurality of transmitter signals comprises a waveform having a set of waveform characteristics that differ from the set of waveform characteristics of any other transmitter signal of the plurality of transmitter signals. The devices and methods transmit a first transmitter signal of the plurality of transmitter signals with a sensor electrode of the plurality of sensor electrodes. The first transmitter signal is selected based on the relative ranking for the plurality of transmitter signals. The devices and methods shift from transmitting the first transmitter signal to transmitting a second transmitter signal of the plurality of transmitter signals based on an amount of a second class of interference in the first transmitter signal, where the second transmitter signal is selected based on the relative ranking for the plurality of transmitter signals.

In accordance with the various embodiments the first class of interference comprises background interference and wherein the second class of interference comprises input object coupled interference. In accordance with the further embodiments, the set of waveform characteristics comprises at least one of a type, frequency, amplitude and phase.

Thus, the various embodiments provide improved interference avoidance for an input device by determining a relative ranking for a plurality of transmitter signals based on a first class of interference and shifting from transmitting a first transmitter signal to transmitting a second transmitter signal based on a second class of interference.

BRIEF DESCRIPTION OF DRAWINGS

The preferred exemplary embodiment of the present invention will hereinafter be described in conjunction with the appended drawings, where like designations denote like elements, and:

FIG. 3 illustrates different sources of a first class and a second class of interference;

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
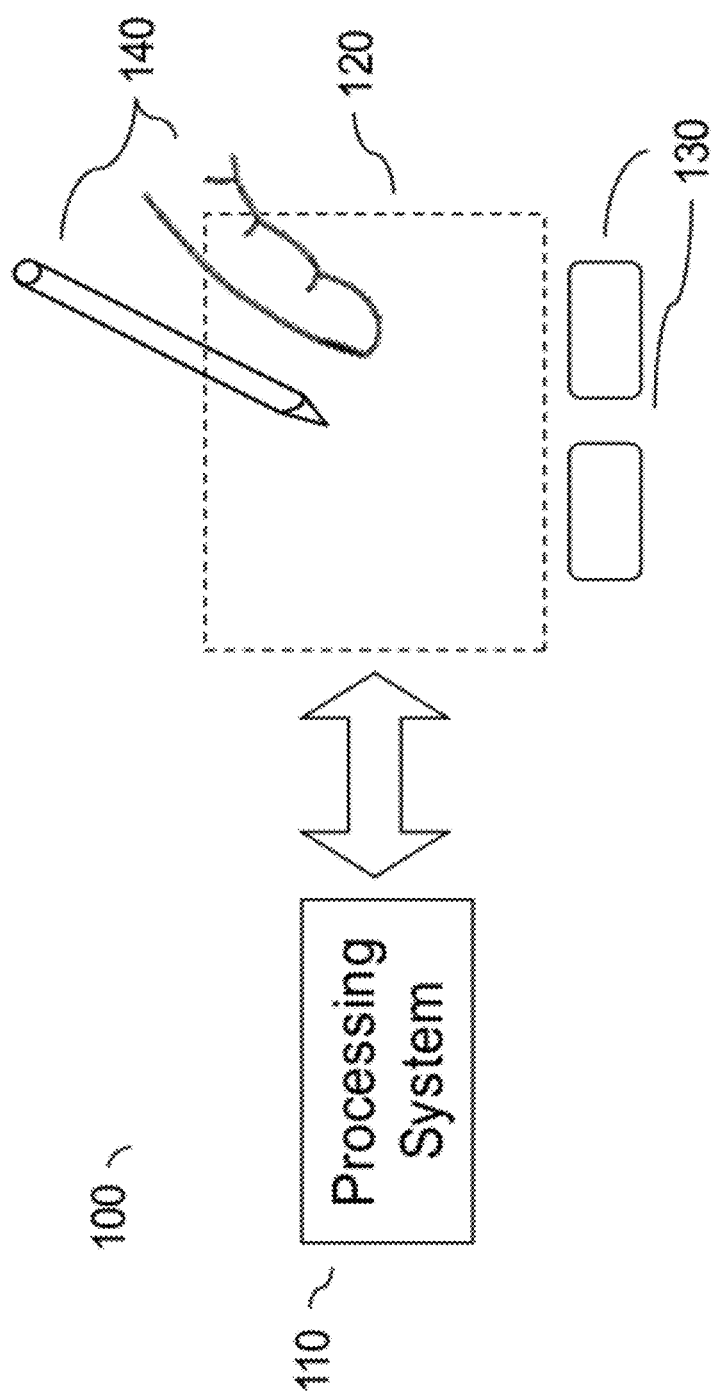
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, surface acoustic wave, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter electrodes and one or more receiving electrodes. Transmitting sensor electrodes may be modulated relative to a reference voltage (e.g., system ground) to facilitate transmission, and receiving sensor electrodes may be held substantially constant relative to the reference voltage to facilitate receipt. Sensor electrodes may be dedicated transmitters or receivers, or may be configured to both transmit and receive.

Sensor electrodes that transmit are sometimes referred to as the "transmitting sensor electrodes," "driving sensor electrodes," "transmitters," "drive electrodes" or "drivers"—at least for the duration when they are driving. Other names may also be used, including contractions or combinations of the earlier names (e.g., "driving electrodes" and "driver electrodes." Sensor electrodes that receive are sometimes referred to as "receiving sensor electrodes," "receiver electrodes," or "receivers"—at least for the duration when they are receiving. Similarly, other names may also be used, including contractions or combinations of the earlier names.

In FIG. 1, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals (resulting signals) indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments the processing system 110 is configured to acquire a capacitance measurements based upon resulting signals. For example, in some embodiments, processing system 110 makes and utilizes a plurality of capacitive measurements, associated with individual electrodes (e.g., the intersections of electrodes 210-1, 220-1) of plurality of electrodes 201, as pixels to create a "capacitive image." In this manner, processing system 110 can capture a capacitive image that is a snapshot of the response measured in relation to an input object or objects in the sensing region 120. In other embodiments, processing system 110 makes and utilizes a plurality of capacitive measurements along a first and second direction to determine two-dimensional positional information. For example, in one embodiment, processing system 110 makes and utilizes a plurality of capacitive measurements from a first plurality of electrodes along a first direction (e.g., plurality of electrodes 230) and a plurality of capacitive measurement from a second plurality of electrodes along a second direction (e.g., plurality of electrodes 240) to create two-dimensional positional information. In various embodiments, peak and centroid measurements may be determined for each direction. In other embodiments, other types of measurements may also be used.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
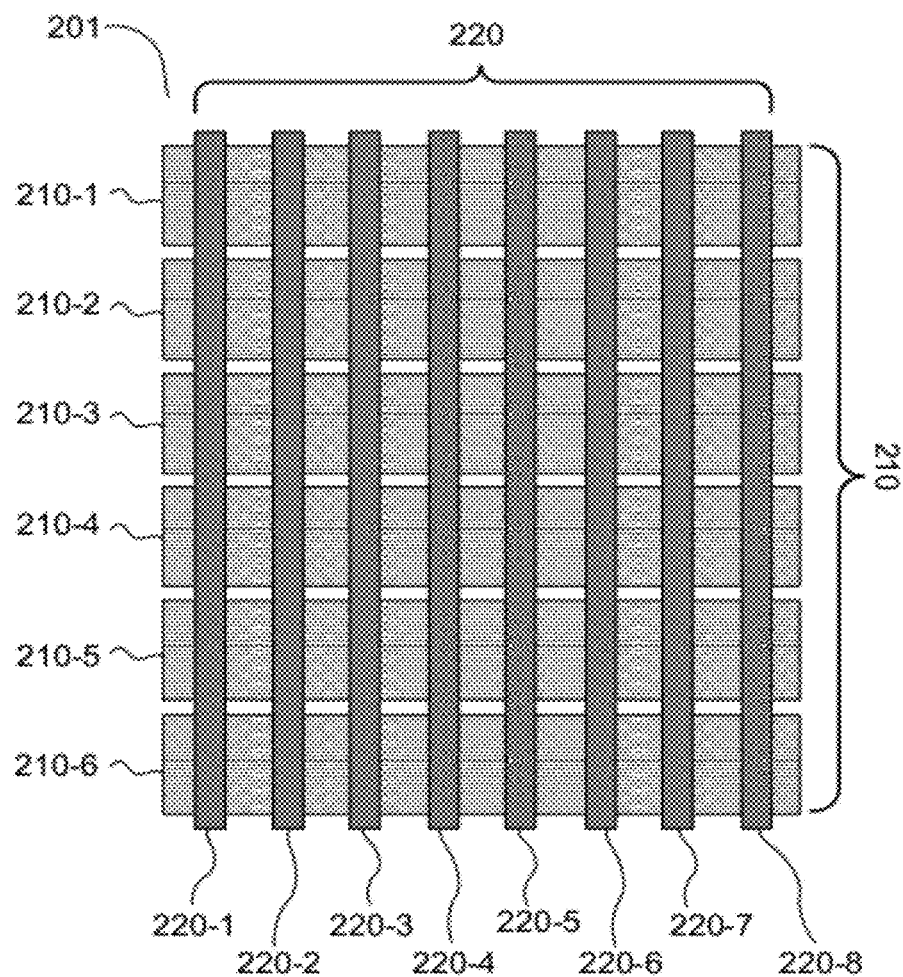
FIGS. 2a and 2b illustrates a portion of an example capacitive sensor pattern which may be disposed in the sensing region of an input device, according to an embodiment.
Figure 2B:
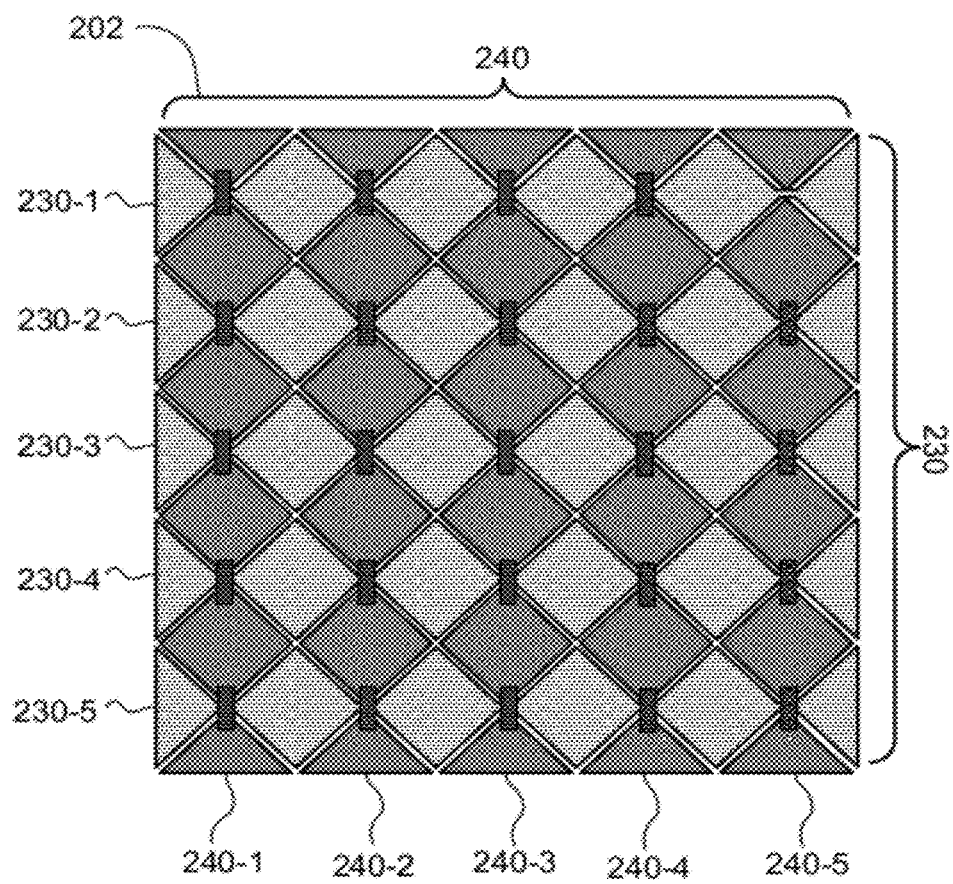

Turning now to FIG. 2a. FIG. 2a illustrates a portion of an example sensor electrode pattern which may be disposed in the sensing region 120 of input device 100. The sensing pattern is made up of a plurality of electrodes 201 (identified individually as 210-1, 210-2, 210-3 . . . 210-*n* and 220-1, 220-2, 220-3 . . . 220-*n*). In one embodiment, sensor electrodes 210 and sensor electrodes 220 may be disposed on a common face or opposing faces of a substrate. In other embodiments sensor electrodes 210 may be disposed on different substrates proximate to one another. While the sensor electrodes 210 shown in FIG. 2*a* are shown as being rectangular in shape, other shapes are also possible. For example, in some embodiments, the sensor electrodes may comprise but are not limited to rectangular, circular and arcuate shapes. In other embodiments at least two sensor electrodes (e.g., sensor electrode 210-1 and sensor electrode 220-1) may be interleaved with each other. In further embodiments, two sensor electrodes may crossover each other multiple times. In yet further embodiments, sensor electrodes may have different lengths and widths. FIG. 2*b* illustrates an example pattern of a plurality of sensor electrodes 202 comprising diamond shapes (identified individually as 230-1, 230-2, 230-3 . . . 230-*n* and 240-1, 240-2, 240-3 . . . 224-*n*). Further, sensor electrodes 240 may comprise a plurality of jumpers which crossover and are insulated from sensor electrodes 230. In one embodiment, sensor electrode 230 and sensor electrodes 240 are be disposed in common layer and the plurality of jumpers are disposed in a different layer.

Processing system 110 is coupled to plurality of sensor electrodes 201 (or plurality of sensor electrode 202), and is configured to determine a relative ranking for a plurality of transmitter signals based on a first class of interference for each transmitter signal of the plurality of transmitter signals. In one embodiment, processing system 110 is further configured to transmit each of the plurality of transmitter signals with a first sensor electrode (e.g., sensor electrode 210-1 or 230-1) of the plurality of sensor electrodes (201 or 202) and receive a resulting signal with a second sensor electrode (e.g., sensor electrode 220-1 or 240-1) of the plurality of sensor electrodes (201 or 202), where each of the resulting signals is based on a transmitter signal. In one embodiment, processing system 110 transmits each transmitter signal with a first set of sensor electrode using a scanning technique. For example, a first transmitter signal is transmitted with sensor electrode 210-1, then with sensor electrode 210-2 until the last sensor electrode of the set is reached (i.e., 220-6). Once the first transmitter signal has been transmitted with each sensor electrode (e.g., sensor electrodes 220, sensor electrodes 230), the next transmitter signal is scanned through each sensor electrode, continuing until the last transmitter signal is scanned through each sensor electrode. Scanning is not meant to imply any order in which the sensor electrodes are transmitted with. In one embodiment, scanning may start with any sensor electrode and end with any sensor electrode. In another embodiment, processing system 110 is configured to transmit each transmitter signal with more than one sensor electrode at a time. In yet another embodiment, processing system 110 is configured to transmit each transmitter signal with a different transmitter electrode. Further, in some embodiments, processing system 110 is configured to receive with more than one sensor electrode at a time. For example, processing system 110 may be configured to receive with sensor electrodes 220 or a subset of sensor electrodes 220 (e.g., sensor electrodes 220-1, 220-2 and 220-3) at the same time. In a further embodiment, processing system 110 is configured to transmit each of the plurality of transmitter signals with a first sensor electrode of the plurality of sensor electrodes (e.g., sensor electrode 210-1, 220-1, 230-1 or 240-1) and receive a resulting signal with the first sensor electrode, where each of the resulting signals is based on a transmitter signal. In other embodiments, processing system 110 may be configured to transmit and receive with more than one sensor electrode at a time. In yet other embodiments, processing system 110 may transmit each transmitter signal and receive resulting signals with a first group of sensor electrodes 230 and then with a second group of sensor electrodes 240.

Each of the plurality of transmitter signals comprises a waveform having a set of waveform characteristics where at least one waveform characteristic differs from at least one waveform characteristic in other transmitter signals. The set of waveform characteristics comprises at least one of a type, frequency, amplitude and phase. The type of waveforms may include, but is not limited to one of a sine, square, triangular, sawtooth or binary. In one embodiment a first transmitter signal comprises a square waveform with a first frequency, amplitude and phase and a second transmitter signal comprises a square waveform, a second frequency, amplitude and phase, where at least one of the second frequency, amplitude and phase differs from a corresponding one of the first frequency, amplitude and phase. In another embodiment, each transmitter signal may comprise a square waveform, have similar amplitude and phase, but differ in frequency. In yet another embodiment, each transmitter may comprise a similar type, and phase but differ in one or both of a frequency or amplitude. In other embodiments, each transmitter signal has a set of waveform characteristics comprising at least one of a type, frequency, amplitude and phase that is different from the set of waveform characteristics for each other transmitter signal. In a further embodiment, each transmitter signal may be defined by a different distinct digital code of a plurality of distinct digital codes.

In one embodiment, processing system 110 is configured to determine a relative ranking for the plurality of transmitter signals based the first class of interference for each transmitter signal by ordering each of the plurality of transmitter signals based on an amount of the first class of interference for each transmitter signal. In one embodiment processing system 110 orders the plurality of transmitter signals, indicating the relative rank of each transmitter signal. For example, in one embodiment, the transmitter signal with the lowest amount of a first class of interference may be indicated with higher rank than that of a transmitter signal with the highest amount of a first class of interference. This may include, but is not limited to; creating a histogram, memory index, or a lookup table that maps each transmitter signal with its respective amount of interference. In other embodiments, any means that maps the transmitter signals with the corresponding amount of interference may be used. A transmitter signal is then selected based at least in part on the ordering. In various embodiments, processing system 110 selects a transmitter signal based on the ordering of each transmitter signal. For example, in one embodiment, processing system 110 may select a transmitter signal having the lowest amount of a first class of interference as indicated by the ordering. In another embodiment, processing system 110 may select any transmitter signal that is indicated as having an acceptable amount of the first class of interference.

Further, in another embodiment, processing system 110 is configured to determine a relative ranking for the plurality of transmitter signals based a first class of interference for each transmitter signal by grouping a first subset of the transmitter signals based on an amount of a first class of interference in each transmitter signal. In one embodiment, the transmitter signals may be grouped into a plurality of subsets. In such an embodiment, subsets may correspond to different ranges of amounts of first class interference, and the transmitter signals are grouped into corresponding subsets based on the amount of first class of interference for each transmitter signal. For example, in one embodiment, a transmitter signal having a substantially low amount of a first class of interference is grouped into a first subset and a transmitter signal having a substantially high amount of a first class of interference is grouped into a second subset. In a further embodiment, processing system 110 may be configured to group the transmitter signals into different subsets by comparing the amount of first class of interference in each transmitter signal to each other. In various embodiments, processing system 110 selects a transmitter signal based on which subset the transmitter signal are grouped into. For example, in one embodiment, processing system 110 selects any transmitter signal from a first subset; the first subset comprising transmitter signals having the lowest amount of first class of interference. In another embodiment, processing system 110 selects the transmitter signal having the lowest amount of a first class of interference within a subset. In another embodiment, processing 110 may select any transmitter signal from any subset that comprises transmitter signals having acceptable amounts of first class of interference.

Processing system 110 may be further configured to determine a relative ranking for the plurality of transmitter signals based on the first class of interference for each transmitter signal by grouping the transmitter signals into subsets and grouping the transmitter signals within each subset based on an amount of first class of interference for each transmitter signal. In further embodiments, each subset of the transmitter signals may be based on a relation of each corresponding measurement of first class of interference for each transmitter signal. For example, the subsets maybe defined by determining which transmitter signals have substantially similar amounts of first class of interference and grouping those into common subsets. In another embodiment, the subsets can be defined based on a predetermined total number of transmitter signals allocated per subset.

Processing system 110 is configured to determine the amount of a first class of interference for each transmitter signal by acquiring a measurement of the first class of interference for a corresponding resulting signal. In one embodiment, the measurement of the first class of interference for each transmitter signal is acquired after each transmission of the transmitter signal. In those embodiments, where the transmitter signal is transmitted more than once or with more than one electrode, the amount of first class of interference for the transmitter signal may be based on an average off all the measurements taken, the measurement showing the largest amount of interference, a ratio of the measurements or a mathematically weighted version of the measurements.

For example, in one embodiment, processing system 110 transmits a first transmitter signal with sensor electrode 210-1 while receiving resulting signals with sensor electrodes 220; the resulting signals corresponding to the first transmitter signal. Processing system 110 may then acquire a measurement of the first class of interference for the first transmitter signal transmitted with sensor electrode 210-1. The measurement is based on the amount of first class of interference in the corresponding resulting signals. Processing system 110 may then transmit the first transmitter signal with a sensor electrode 210-2 while receiving resulting signals with sensor electrodes 220; the resulting signals corresponding to the first transmitter signal. Processing system 110 may then acquire a measurement of the first class of interference for the first transmitter signal transmitted with sensor electrode 210-2. The measurement is based on the amount of first class of interference in the corresponding resulting signals. Processing system 110 continues to transmit the first transmitter signal with a different sensor electrode of sensor electrodes 210 and receiving resulting signals with sensor electrodes 220 until the first transmitter signal has been transmitted with each sensor electrode. Processing system 110 acquires a measurement of the first class of interference for the first transmitter signal for each different sensor electrode of sensor electrodes 210. Processing system 110 may then characterize an amount of first class of interference for the first transmitter signal for input device 100. In various embodiments, processing system 110 may characterize the amount of first class of interference by one of, but is not limited to, averaging the measurements of first class of interference, calculating a variation of the measurements, determining the maximum amount of first class of interference, determining the minimum amount of first class of interference, and determining a median amount of first class of interference. In other embodiments, other characterization techniques may also be used. Processing system 110 may then repeat the above process with each transmitter signal, determining the amount of first class of interference for each transmitter signal. Further, even though the above example describes transmitting on a single sensor electrode and receiving on multiple different sensor electrodes, any of the previously described methods of transmitting and receiving may be used.

In various embodiments, processing system 110 receives resulting signals, demodulates and analyzes the resulting signals to acquire a measurement of the first class of interference for each transmitter signal. Demodulating the resulting signal may be done by any circuit or element capable of demodulating the resulting signals. For example, in various embodiments, this may include any suitable digital or analog demodulator, sampled or continuous. Further, in various embodiments, a demodulation filter may be implemented with any suitable low-pass or band-pass filter, including any sort of digital or analog filter, sampled or continuous. A demodulation filter could alternatively be implemented and/or supplemented by a digital filter (e.g. an averaging filter). In some embodiments, the output of the demodulation is then filtered by processing system 110.

The demodulated resulting signals can be individually and/or collectively processed in any manner to determine the amount of first class of interference for the transmitter signal. In one embodiment, a measurement of the peak or mean of the first class of interference may be compared to one or more threshold values. This facilitates a determination of the amount of interference without requiring a direct calculation of amount.

As other examples, the demodulated resulting signals can be analyzed over any suitable period of time to determine an interference measurement for the first class of interference. For example, the maximum absolute value of the interference outputs over some time period may be recorded. Alternatively, the average absolute values may be computed. Alternatively, the mean square or root mean square derivative may be computed. Further, in other embodiments, other statistical properties may be computed and analyzed to determine an interference measurement.

During operation of input device 100, processing system 110 may be configured to update the relative ranking for the plurality of transmitter signals. In various embodiments, processing system 110 updates the relative ranking during initialization, during reset, or by request of an application. In other embodiments, the relative ranking may be updated periodically or aperiodically. In one embodiment, the relative ranking may be stored in memory and restored when requested. For example, the relative ranking may be restored after initialization or reset of input device 100. In other embodiments, an application may request the relative ranking be restored.

In one embodiment, an initial relative ranking for each transmitter signal may be predetermined during a tuning process. The initial relative ranking may then be updated using the above methods and in some embodiments restored after initialization or reset of input device 100, by request of an application or after a period of time. In one embodiment, the initial relative ranking may be restored if an updated relative ranking become corrupted.

In various embodiments, while processing system 110 determines a relative ranking for the transmitter signals, an input object (i.e., 140) may be detected in the sensor region 120 of the input device. In one embodiment, processing system 110 may abort determining a relative ranking when the input object (i.e., 140) is detected. In another embodiment, processing system 110 may pause determining a relative ranking when the input object is detected and continue determining the relative ranking when the input object is no longer detected. In yet another embodiment, processing system 110 continues to determine a relative ranking when an input object is detected.

Processing system 110 is further configured to shift from transmitting the first transmitter signal to transmitting a second transmitter signal with the sensor electrode based on an amount of a second class of interference in the first transmitter signal. The second transmitter signal is selected based on the relative ranking for the plurality of transmitter signals. In one embodiment, the first and second classes of interference are substantially different. For example, the first class of interference comprises background interference and the second class of interference comprises input object coupled interference. Processing system 110 is further configured to shift from transmitting the first transmitter signal to transmitting the second transmitter signal when the amount of second class of interference in the first transmitter signal exceeds a threshold. In another embodiment, processing system 110 is further configured to shift from transmitting the first transmitter signal to transmitting the second transmitter signal when the amount of second class of interference in the first transmitter signal exceeds or meets a threshold.

Processing system 110 selects a first transmitter signal based on relative ranking and transmits the first transmitter signal with a first sensor electrode (e.g., sensor electrode 210-1, 220-1 or 230-1). In other embodiments, processing system 110 may be also configured to simultaneously transmit on more than one sensor electrode or on a one at-a-time basis. In one embodiment, processing system 110 selects a transmitter signal that is indicated by the relative ranking as having the lowest amount of the first class of interference. In other embodiments, processing system 110 selects a transmitter signal that has an acceptable amount of first class of interference. In another embodiment, processing system 110 selects a transmitter signal having an amount of the first class of interference that is below a threshold amount. In yet another embodiment, processing system 110 selects a transmitter signal having an amount of the first class of interference that is below or meets a threshold amount. In other embodiments, processing system 110 selects a transmitter signal within a first subset of transmitter signals. In yet further embodiments, processing system 110 selects a transmitter signal not only based on an amount of first class of interference and but also based other sensing features of input device 100. For example, processing system 110 may select a transmitter signal that has an acceptable amount of first class of interference and maximizes the report rate of the capacitive sensor device. In other embodiments, other sensing features may be taken into consideration when selecting a transmitter signal.

In various embodiments, once a transmitter signal is selected by processing system 110, the transmitter signal may be used for determining positional information for an input object. For example, processing system 110 selects a first transmitter signal and transmits the first transmitter signal with a first sensor electrode. The transmitted first transmitter signal causes a first resulting signal, and the processing system 110 receives the first resulting signal with at least one sensor electrode. In one embodiment, processing system 110 is configured to transmit and receive with different sensor electrodes. In another embodiment, processing system 110 is configured to transmit and receive with the same electrode or electrodes. Processing system 110 determines an amount of a second class of interference for the first transmitter signal and based on the amount of the second class of interferences, processing system 110 may shift to a second transmitter signal. In one embodiment, processing system 110 determines an amount of a second class of interference by transmitting the first transmitter signal and receiving resulting signals corresponding to the first transmitter signal. Processing system 110 may then acquire a measurement of a second class of interference for the first transmitter signal based on resulting signals. In various embodiments, processing system 110 acquires the measurement by measuring the amount of second class of interference for each resulting signal. Processing system 110 may average those amounts or analyze the amounts individually to determine a set of statistical properties for each measurement. In one embodiment, processing system 110 may determine a peak, mean and/or minimum amount of second class of interference. In other embodiments, other statistical properties of the measurement may also be used.

In various embodiments, processing system 110 receives resulting signals, demodulates and analyzes the resulting signals to acquire a measurement of the second class of interference for the transmitter signal. Demodulating the resulting signal may be done by any circuit or element capable of demodulating the resulting signals. For example, in various embodiments, this may include any suitable digital or analog demodulator, sampled or continuous. Further, in various embodiments, a demodulation filter may be implemented with any suitable low-pass or band-pass filter, including any sort of digital or analog filter, sampled or continuous. A demodulation filter could alternatively be implemented and/or supplemented by a digital filter (e.g. an averaging filter). In some embodiments, the output of the demodulation is then filtered by processing system 110.

The demodulated resulting signals can be individually and/or collectively processed in any manner to determine the amount of second class of interference for the transmitter signal. In one embodiment, a measurement of the peak or mean of the second class of interference may be compared to one or more threshold values. This facilitates a determination of the amount of interference without requiring a direct calculation of amount.

As other examples, the demodulated resulting signals can be analyzed over any suitable period of time to determine an interference measurement. For example, the maximum absolute value of the interference outputs over some time period may be recorded. Alternatively, the average absolute values may be computed. Alternatively, the mean square or root mean square derivative may be computed. Alternatively, the mean square or root mean square derivative may be computed. Further, in other embodiments, other statistical properties may be computed and analyzed to determine an interference measurement.

The second transmitter signal is selected based on the relative ranking for the plurality of transmitter signals. Processing system 110 may determine the amount of second class of interference for the first transmitter signal by measuring the amount of second class of interference in the corresponding first resulting signal. In one embodiment, when the amount of the second class of interference for the first transmitter signal exceeds a threshold amount, processing system 110 shifts to a second transmitter signal. In another embodiment, when the amount of the first class of interference for the first transmitter signal meets or exceeds a threshold amount, processing system 110 shifts to a second transmitter signal. Further, the second transmitter signal may be a transmitter signal having the next lowest amount of first class of interference, be of the same subset as the first transmitter signal or randomly selected from a group of transmitter signals have an acceptable amount of first class of interference.

A transmitter signal having an acceptable amount of first class of interference or an acceptable amount of second class of interference may be defined as any amount that is below and/or meets a predetermined amount. In another embodiment, a transmitter signal having an acceptable amount of first class of interference or an acceptable amount of second class of interference may be defined as a transmitter signal that has an amount of first class of interference or second class of interference that does significantly affect positional-information determination of an input object. The amount of second class of interference for the second transmitter signal may be determined and, depending on the amount of second class of interference, processing system 110 may shift to a third transmitter signal that is selected using any of the above methods.

The first class of interference may be described as being background interference. For example, in various embodiments the first class of interference may be described as being interference that affects input device 100 when no input object (e.g., input object 140) is proximate to input device 100. In one embodiment, the first class of interference may be described as being interference that affects input device 100 when no input device is in sensing region 120 of input device 100. Further, the first class of interference may be described as being persistent, where the spectrum and magnitude of the interference does not substantially vary over a relatively short period of time. Even further, the first class of interference may be described as affecting different sensor electrodes similarly. That is, the first class of interface may be substantially uniform in its effects on the sensor electrodes.

The second class of interference may be described as being input object coupled interference. For example, in various embodiments, second class of interference may be described as being interference that may substantially only affect input device 100 when an input object (e.g., input object 140) is proximate to input device 100. In one embodiment, the second class of interference may be described as being interference that may substantially only affect input device 100 when an input object (e.g., input object 140) is in sensing region 120 of input device 100. In such embodiments, the second class of interference may be coupled to input device 100 through input object 140. In one embodiment, the second class of interference may be described as being localized, only affecting the sensor electrodes proximate to input object 140. Further, the second class of interference may be described as be sporadic, where the both the interference spectrum and magnitude of the interference may vary significantly over relatively short time periods. Even further, the second class of interference may be described as being spatially correlated interference having substantially similar properties on different sensor electrodes.

FIG. 3 illustrates different sources of first class of interference and second class of interference. First class of interference sources may include but are not limited to internal circuit components and signal transmitters, display devices and microprocessors. In one embodiment, when sensing region 120 of input device 100 overlaps at least a portion of a display device, interference from the display device affects each of the sensor electrodes in a similar manner and degree. Second class of interference sources may include, but are not limited to external light sources, power sources and wireless transmissions, as well as proximate electrical devices such as televisions and appliances. These different types of interferes are coupled to input device 100 through a proximate input object (e.g., input object 140 within sensing region 120).

In one embodiment, processing system 110 is further configured to acquire a measurement of a change in a transcapacitive coupling between a first sensor electrode and a second sensor electrode (i.e., 210-1 and 220-1) of the plurality of sensor electrodes. In another embodiment, processing system 110 is further configured to acquire a measurement of a change in a capacitive coupling between a first sensor electrode (i.e., 210-1) and an input object. In each embodiment, the measurement is based on a resulting signal received with either sensor electrode 220-1 or sensor electrode 210-1. Further, processing system 110 determines positional information for an input object based on the measurement. In one embodiment, processing system 110 determines an amount of second class of interference for the first transmitter signal and if the amount of interference is less than a threshold amount, processing system 110 determines positional information for input object 140. In another embodiment, processing system determines an amount of second class of interference for the first transmitter signal and if the amount of interference is less than or meets a threshold amount, processing system 110 determines positional information for input object 140. However, in some embodiments, if the amount of interference is determined to be greater than a threshold amount, processing system 110 may shift to a second transmitter signal, and transmit the second transmitter signal with a sensor electrode of the plurality of sensor electrodes (e.g., sensor electrode 210-1).

Figure 4:
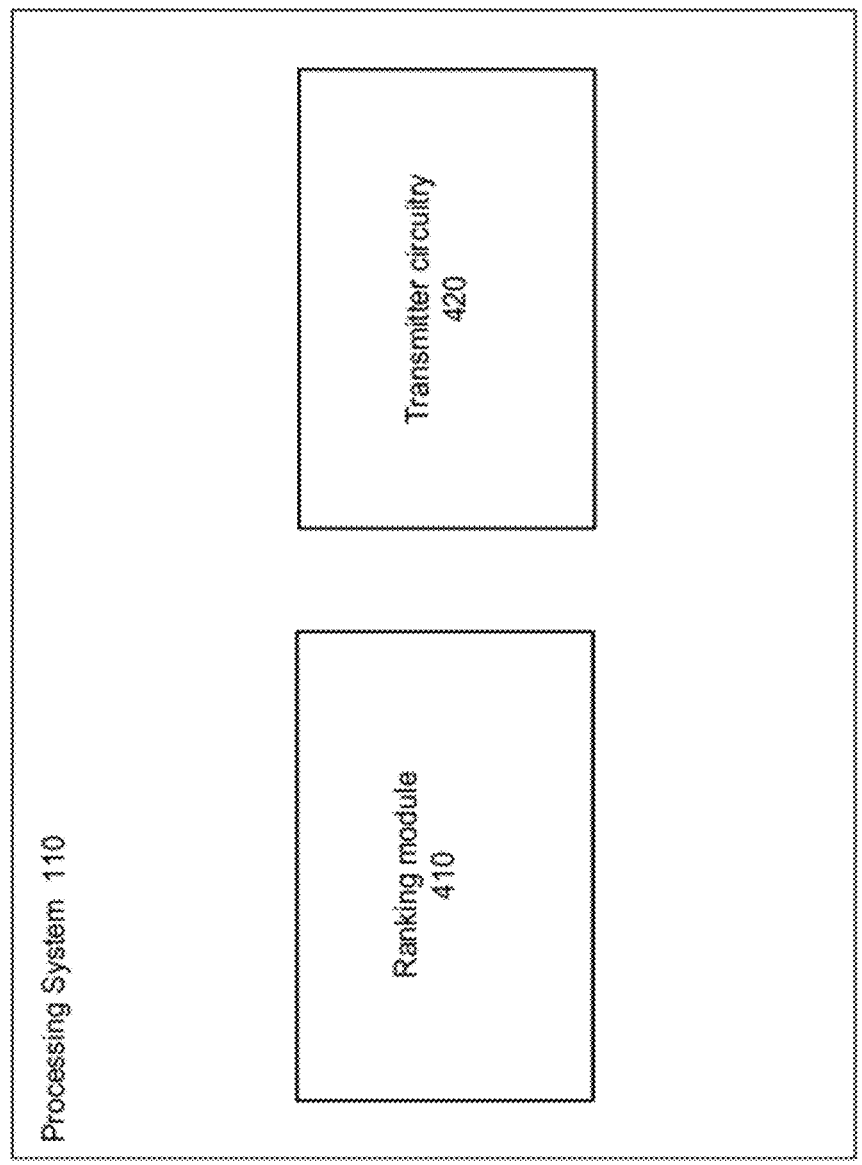
FIG. 4 illustrates a first example processing system which may be utilized with an input device, according to various embodiments.

Turning now to FIG. 4, in one embodiment, processing system 110 comprises a ranking module 410 and transmitter circuitry 420. As described above, ranking module 410 is configured to determine a relative ranking for a plurality of transmitter signals based on a first class of interference for each transmitter signal. In one embodiment, the ranking module is further configured to order each of the plurality of transmitter signals based on an amount of first class of interference for each transmitter signal. In another embodiment, the ranking module is further configured to group a first subset of the plurality transmitter signals based on an amount of the first class of interference in each transmitter signal of the plurality of transmitter signals, wherein the first subset comprises the first and second transmitter signals.

Transmitter circuitry 420, as described above, is configured to transmit a first transmitter signal of a plurality of transmitter signals with at least one sensor electrode of the plurality of sensor electrodes 201. Transmitter circuitry 420 is further configured to shift from transmitting the first transmitter signal to the second transmitter signal of the plurality of transmitter signals based on an amount of a second class of interference in the first transmitter signal. Further, transmitter circuitry 420 is configured to shift from transmitting the first transmitter signal to transmitting the second transmitter signal with a sensor electrode when the amount of the second class of interference in the first transmitter signal exceeds a threshold.

In one embodiment, processing system 110 further comprises receiver circuitry configured to receive a first resulting signal with a second sensor electrode of the plurality of sensor electrodes 201. In another embodiment, processing system 110 further comprises receiver circuitry configured to receive a first resulting signal with the first sensor electrode of the plurality of sensor electrodes 201. In one embodiment, as described above, transmitter circuitry 420 transmits with sensor electrode 210-1 and receiver circuitry receives with sensor electrode 220-1. In another embodiment, as described above, transmitter circuitry 420 transmits and receiver circuitry receives with sensor electrode 210-1. In other embodiments, transmitter circuitry 420 may transmit with more than one sensor electrode and receiver circuitry may receive with more than one sensor electrode.

In a further embodiment, processing system 110 comprises determination module configured to, as described above, acquire a measurement of a change in a transcapacitive coupling between a sensor electrode (i.e., sensor electrode 210-1) and a second sensor electrode (i.e., sensor electrode 220-1), wherein the measurement is based on the first resulting signal. The determination module is further configured to determine positional information an input object based on the measurement. In another embodiment, the determination module is configured to acquire a measurement of a change in a capacitive coupling between the sensor electrode (i.e., sensor electrode 210-1) and an input object, wherein the measurement is based on the first resulting signal. The determination module is further configured to determine positional information an input object based on the measurement.

Figure 5A:
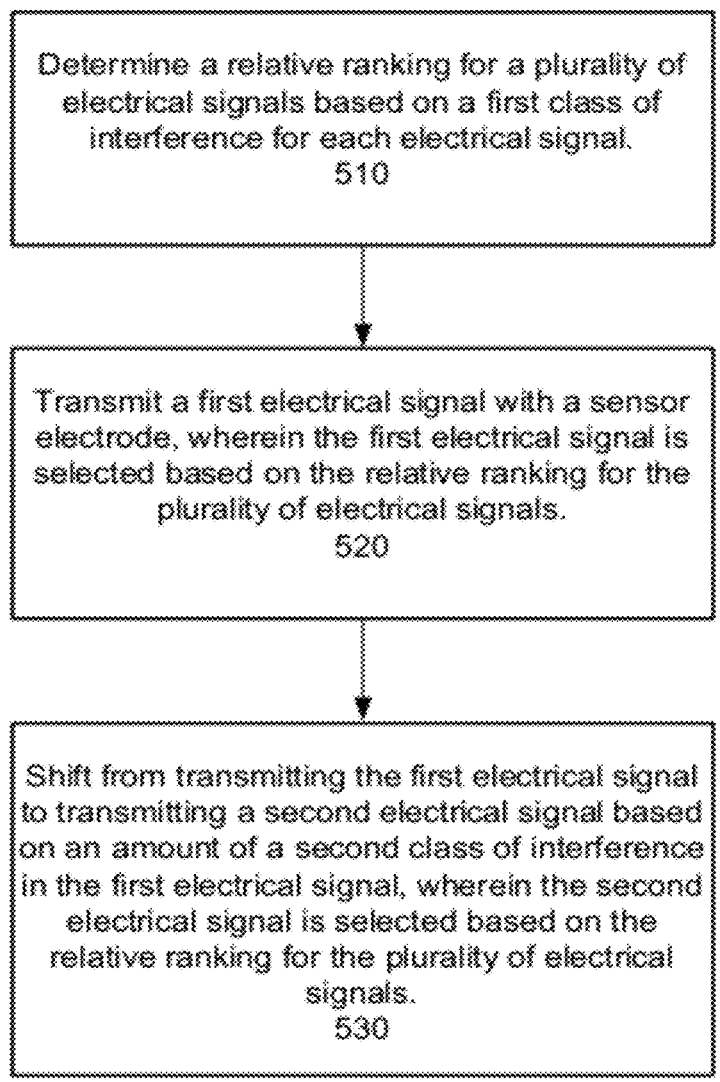
FIGS. 5a-5c illustrate a method of an example method of interference avoidance for a capacitive sensor device, according to various embodiments.

FIG. 5a illustrates method 500, an example method of interference avoidance within a capacitive sensor device. For purposes of illustration, reference will be made to components of input device 100 of FIG. 1 and the sensor electrode pattern of FIG. 2a. However, it should be noted that the method 500 could be implemented with other input devices and electrode pattern configurations. In some embodiments, not all of the procedures described in method 500 are implemented. In some embodiments, other procedures in addition to those described may be implemented. In some embodiments, procedures described in method 500 may be implemented in a different order than illustrated and/or described.

At 510 of method 500, a relative ranking is determined for a plurality of transmitter signals based on a first class of interference for each transmitter signal. In one embodiment, each of the plurality transmitter signals is ordered based on an amount of the first class of interference for each transmitter signal of the plurality of transmitter signals. In another embodiment, a first subset of the plurality of transmitter signals are grouped based on an amount of the first class of interference in each electrical of the plurality of transmitter signals.

At 520 of method 500, a first transmitter signal is transmitted with a first sensor electrode (e.g., 210-1), wherein the first transmitter signal is selected based on the relative ranking for the plurality of transmitter signals. For example, by selecting the first transmitter signal having the lowest relative amount of the first class of interference. As another example, by selecting any transmitter signal having a first class of interference below a threshold.

At 530 of method 500, transmitting is shifted from transmitting the first transmitter signal to transmitting a second transmitter signal based on an amount of a second class of interference in the first transmitter signal, wherein the second transmitter signal is selected based on the relative ranking for the plurality of transmitter signals. In general, 530 may be performed in response to a change occurring in interference such that the second class of interference was above a desirable level when transmitting the first transmitter signal. And again, the selection of the second transmitter signal based on the relative ranking can be performed in a variety of ways. For example, by selecting the next transmitter signal having the lowest relative amount of the first class of interference, or by selecting any transmitter signal having the first class of interference below a threshold.

Figure 5B:
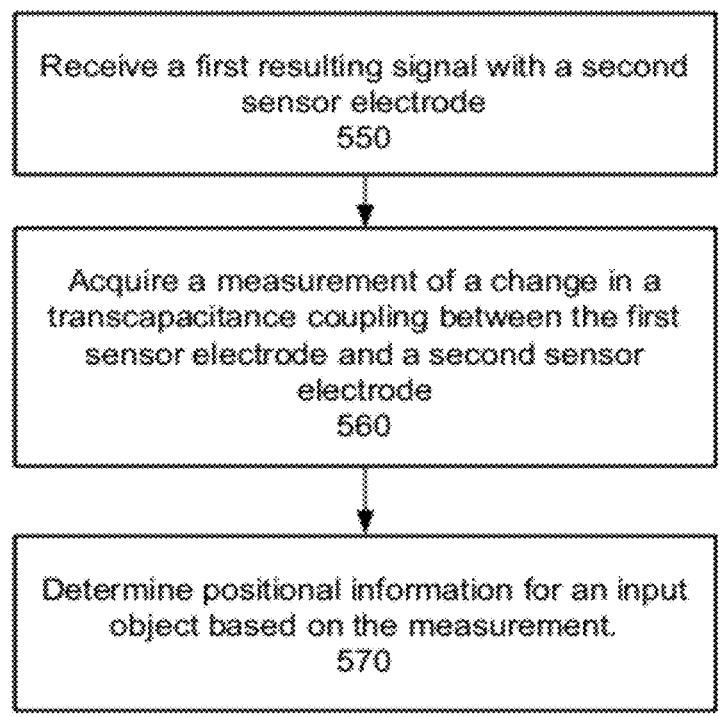

Method 500 is continued in FIG. 5b. At 550 of method 500, a first resulting signal is received with a second sensor electrode (e.g., 220-1). The first resulting signal is based on the first transmitter signal. In one embodiment, 550 of method 500 may occur after 520 of FIG. 5a. At 560 of method 500, a measurement of a change in a transcapacitance coupling is acquired between the first sensor electrode (e.g., 210-1) and a second sensor electrode (e.g., 220-1). At 570 of method 500, positional information for an input object based on the measurement is determined.

Figure 5C:
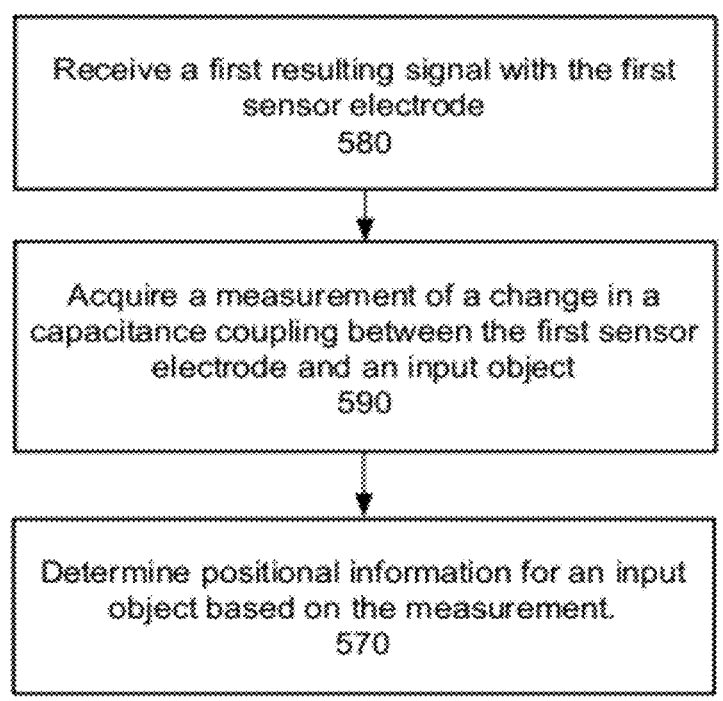

Method 500 is continued in FIG. 5c. At 580 of method 500, a first resulting signal is received with a first sensor electrode (e.g., 210-1). In one embodiment, 580 of method 500 may occur after 520 of FIG. 5a. At 590 of method 500, a measurement of a change in a capacitance coupling is acquired between the first sensor electrode (e.g., 210-1) and an input object (e.g., 140). At 570 of method 500, positional information for an input object based on the measurement is determined.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:
1. An input device comprising:
 a plurality of sensor electrodes; and
 a processing system coupled to the plurality of sensor electrodes, the processing system configured to:
  determine a relative ranking for transmitting a plurality of transmitter signals based on an amount of background interference for each transmitter signal of the plurality of transmitter signals, wherein each transmitter signal of the plurality of transmitter signals comprises a waveform having a set of waveform characteristics that differ from the set of waveform characteristics of any other transmitter signal of the plurality of transmitter signals;
  transmit, over a sensor electrode from the plurality of sensor electrodes, a first transmitter signal of the plurality of transmitter signals using the relative ranking;

determine an amount of input object coupled interference in the first transmitter signal;

select, using the amount of the input object coupled interference, a second transmitter signal from the relative ranking; and transmit, over the sensor electrode, the second transmitter signal.

2. The input device of claim 1, wherein the set of waveform characteristics comprises at least one of a type, frequency, amplitude and phase.

3. The input device of claim 1, wherein the processing system is configured to determine the relative ranking for the plurality of transmitter signals by:

grouping a first subset of the plurality of transmitter signals based on Dull the amount of the background interference in each transmitter signal of the plurality of transmitter signals, wherein the first subset comprises the first and second transmitter signals.

4. The input device of claim 1, wherein the processing system is further configured to:

transmit the second transmitter signal when the amount of the input object interference for the first transmitter signal exceeds a threshold.

5. The input device of claim 1, further comprising:

a display device; wherein the background interference is associated with the display device; wherein the plurality of sensor electrodes are configured to sense in a sensing region; and wherein the sensing region overlaps at least a portion of the display device.

6. A processing system configured for interference avoidance within a capacitive sensor device, the processing system comprising:

a ranking module configured to determine a relative ranking for transmitting a plurality of transmitter signals based on an amount of background interference for each transmitter signal of the plurality of transmitter signals, wherein each transmitter signal of the plurality of transmitter signals having a set of waveform characteristics that differ from the set of waveform characteristics of any other transmitter signal of the plurality of transmitter signals; and transmitter circuitry configured to:

transmit, over a first sensor electrode from a plurality of sensor electrodes, a first transmitter signal of the plurality of transmitter signals using the relative ranking;

determine an amount of input object coupled interference in the first transmitter signal;

select, using the amount of the input object coupled interference, a second transmitter signal from the relative ranking; and transmit, over the first sensor electrode, the second transmitter signal.

7. The processing system of claim 6, wherein the transmitter circuitry is further configured to transmit the second transmitter signal when the amount of the input object coupled interference for the first transmitter signal exceeds a threshold.

8. The processing system of claim 6, wherein the processing system further comprises:

receiver circuitry configured to receive a first resulting signal with a second sensor electrode of the plurality of sensor electrodes, wherein the first resulting signal is based on the first transmitter signal; and a determination module configured to acquire a measurement of a change in a transcapacitive coupling between the first sensor electrode and the second sensor electrode, wherein the measurement is based on the first resulting signal, wherein the determination module is further configured to determine positional information an input object based on the measurement.

9. The processing system of claim 6, wherein said processing system further comprises:

receiver circuitry configured to receive a first resulting signal with the first sensor electrode of the plurality of sensor electrodes, wherein the first resulting signal is based on the first transmitter signal; and a determination module configured to acquire a measurement of a change in a capacitive coupling between the first sensor electrode and an input object, wherein the measurement is based on the first resulting signals, wherein the determination module is further configured to determine positional information for the input object based on the measurement.

10. A method of interference avoidance within a capacitive sensor device, the method comprising:

determining a relative ranking for transmitting a plurality of transmitter signals based on an amount of background interference for each transmitter signal of the plurality of transmitter signals, wherein each transmitter signal of the plurality of transmitter signals having a set of waveform characteristics that differ from the set of waveform characteristics of any other transmitter signal of the plurality of transmitter signals;

transmitting, over a first sensor electrode, a first transmitter signal of the plurality of transmitter signals using the relative ranking;

determining an amount of input object coupled interference in the first transmitter signal;

selecting, using the amount of the input object coupled interference, a second transmitter signal from the relative ranking; and transmitting, over the first sensor electrode, the second transmitter signal.

11. The method of claim 10, wherein determining the relative ranking for the plurality of transmitter signals comprises:

grouping a first subset of the plurality of transmitter signals based on the amount of the background interference in each transmitter signal of the plurality of transmitter signals, wherein the first subset comprises the first and second transmitter signals.

12. The method of claim 10, further comprising transmitting a third transmitter signal of the plurality of transmitter signals based on an amount of input object coupled interference in the second transmitter signal, wherein the third transmitter signal is selected based at least in part on the relative ranking for the plurality of transmitter signals.

13. The method of claim 10, wherein the second transmitter signal is transmitted when the amount of the input object coupled interference for the first transmitter signal exceeds a threshold.

14. The method of claim 10, further comprising:

receiving a first resulting signal with a second sensor electrode, wherein the first resulting signal is based on the first transmitter signal;

acquiring a measurement of a change in a transcapacitive coupling between the first sensor electrode and the second sensor electrode, wherein the measurement is based on the first resulting signal; and determining positional information an input object based on the measurement.

* * * * *

UNITED STATES PATENT AND TRADEMARK OFFICE
CERTIFICATE OF CORRECTION

PATENT NO. : 9,965,104 B2
APPLICATION NO. : 13/009606
DATED : May 8, 2018
INVENTOR(S) : Petr Shepelev et al.

It is certified that error appears in the above-identified patent and that said Letters Patent is hereby corrected as shown below:

In the Claims

Claim 3, Column 17, Line 15, the word "Dull" should be removed.

Signed and Sealed this
Twenty-fifth Day of June, 2019

Andrei Iancu
*Director of the United States Patent and Trademark Office*